Dec. 5, 1933.   W. H. RUDOLPH   1,937,982
COUPLING
Filed May 29, 1930
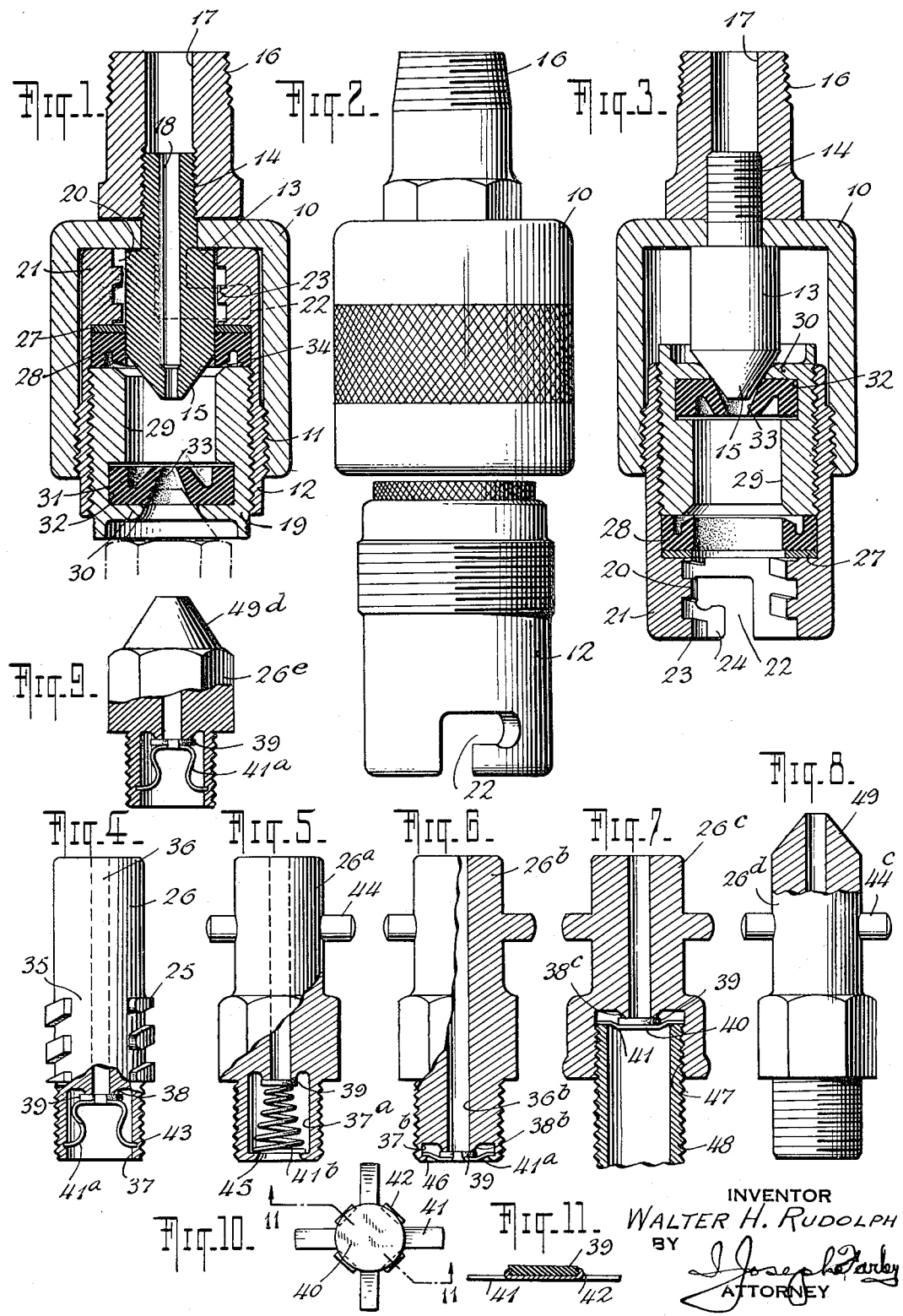
INVENTOR
WALTER H. RUDOLPH
BY
Joseph Parker
ATTORNEY Patented Dec. 5, 1933

1,937,982

UNITED STATES PATENT OFFICE 1,937,982

COUPLING

Walter H. Rudolph, Brookline, Mass.

Application May 29, 1930. Serial No. 456,881

11 Claims. (Cl. 285—175)

This invention relates to quickly detachable couplings of the type wherein the ends of two pipes or conduits may be temporarily placed in communication and a tight seal between said pipes established and maintained during the time they are in communication, which seal is capable of preventing leakage under relatively high pressures.

The principal object of the present invention is to provide a new and improved construction for a coupling adapted for universal application to, or use with, many different types of connecting nipples now on the market such as are used to permit the injection under pressure of grease or oil to the journals, bearings or the like of automobiles or other machinery and although having marked adaptability for use in connection with such lubricating apparatus yet capable of use in many other relations.

Another object is to provide a coupling for lubricating devices, so constructed and arranged that its use is not limited to one particular type of connecting or oiling nipple and that can be used by a ready reversal of certain of its constituent parts for nipples of markedly different characteristics without the necessity of resorting to the use of specially designed and constructed adapters.

A further object is to provide a coupling of new and improved construction, all the parts of which are so designed that such parts may be produced by the simplest of manufacturing operations capable of being performed by automatic screw, or die punching, machines, thereby effecting great savings in production costs.

Another object is to provide the female member of the coupling with a packing ring that is held in fixed immovable position with such member and which is so constructed that the greater the pressure of the fluid passing through the coupling the tighter such packing will be forced into sealing relationship.

A further object is to construct the male member of the coupling as a nipple that includes a spring pressed one way or check valve for normally sealing the bore of the nipple, and in which the spring not only serves to hold the valve closed but is arranged in interlocked engagement with both the coupling member and the valve to retain the latter within the coupling.

Another object is to provide the female coupling member with a reversible member which when in one position enables the coupling to be used with various types of interlocking connections and when in another position permits its use with the pressure-hold types of couplings.

The above and other objects of the invention will appear more fully from the following more detailed description and by reference to the accompanying drawing forming a part hereof and wherein Fig. 1 is a central longitudinal section of a coupling constructed in accordance with the principles of my invention and showing a reversible member of the coupling in position to be used with male coupling members of the pressure-hold type; Fig. 2 is a side elevation showing the reversible member of the coupling detached from the main casing; Fig. 3 is a view similar to Fig. 1 showing the reversible member in position for engaging male members of the interlocking type; Fig. 4 is a side elevation, partly in section, of a male coupling member provided with a breech block style of interlocking screw; Figs. 5, 6, 7, 8 and 9 are views similar to Fig. 4, Figs. 5, 6 and 7 showing bayonet type male coupling members with different means for holding the valve thereof in place, Fig. 8 being a view of a combined pressure-hold and bayonet type male coupling member and Fig. 9 a pressure-hold coupling member; Fig. 10 is a plan view of a valve and spring assembly and Fig. 11 is a central cross section on the line 11—11 of Fig. 10.

As hereinbefore pointed out while the principles and constructional features of the present invention are applicable to any hydraulic coupling, the invention has particular adaptability for use in connection with lubricating devices in which oil, grease, or other lubricant is injected under pressure into a bearing, journal, or other article to be lubricated. Couplings for use in connection with lubricating devices as heretofore constructed are subject to the objection that the female coupling member which is usually connected by means of a flexible hose to a pump, grease gun, or other apparatus for forcing the lubricant through the coupling, are usually designed for use with only a single type of male coupling member, the male coupling member ordinarily being fixed to the part to be lubricated. Two general types of coupling members are in use for lubricating devices at present, one type being known as the pressure-hold type in which the male and female coupling members are so constructed that a sealing joint may be effected by merely holding one of the coupling members against the other by pressure while the lubricant is being injected. The other type of coupling members may be generally classified as of the interlocking type in which the male and female members are held together in sealed leak-proof relationship by suitable interlocking means such as the old and common bayonet joint, screwthreads, breech blocks, or the like. As constructed at present the pressure-hold type coupling can not be used with the interlocking type nipple or vice versa. Therefore, it is now necessary either to have a number of different couplings on hand or to resort to the use of specially constructed adapters. In accordance with the present invention a single female coupling member may be used universally with many different types of male coupling members.

As shown in the drawing the numeral 10 indicates a cup-shaped casing, the bore of which is provided with screwthreads 11 for the reception of a packing retaining member 12 presently to be more fully described. The casing 10 carries a nozzle 13 which at one end is reduced and screwthreaded as indicated by the reference character 14 and which at the other end is provided with a conically shaped tip 15. The reduced end 14 of the nozzle passes through an aperture in the base of the cup-shaped casing 10 and engages with a screwthreaded bore of a nut or nipple 16, the latter being provided on its exterior with a pipe thread, and having a central bore 17. The nipple 16 serves for attaching to the coupling a section of pipe, a flexible hose or the like. The bore 17 of the nipple 16 communicates with a longitudinal bore 18 of the nozzle 13.

The packing retaining member 12 is in the form of a sleeve provided on its outer periphery with screwthreads for engagement with the screwthreads 11 of the cup-shaped casing 10. One end of the member 12 is counterbored and screwthreaded for the reception of a washer retainer cap 19, while the other end of said member 12 has a central bore 20 of smaller diameter than, but in axial alignment with, said counterbore, the member 12 therefore on said other end having walls 21 of much greater thickness than the walls of the counterbore. The walls 21 are preferably provided with a plurality of means for enabling the female coupling member to be used universally in combination with male coupling members of the different interlocking types hereinbefore referred to. Such means as shown most clearly in Figs. 2 and 3 of the drawings comprise a pair of bayonet slots 22 and screwthreads 23. The screwthreads 23 may be of any suitable construction or pitch. I have shown such threads in the drawing as triple threads so that the engagement with the male coupling member may be effected by a minimum amount of relative rotation between the male and female coupling member. In order to further reduce the amount of rotation required for securing the male or female members in interlocking engagement, the threads may be of the breech block type, that is to say, of the type wherein opposite quarters of the thread are entirely cut away to provide a passageway as indicated by the reference character 24, through which the screwthreads 25, see Fig. 4, of the male coupling member 26 may be passed longitudinally of the axes of the coupling members and the interlocked engagement effected by producing relative rotation of one quarter of revolution between the two members.

Seated within the base of the counterbore of the packing retaining sleeve 12 is a thin metallic washer 27 against which is seated a cup-shaped washer 28 of suitable flexible packing material, such as leather, or the like. The cup-shaped washer 28 is retained in position within the sleeve 12 by the packing retaining cap 19. The packing retaining cap 19 is provided with a central bore 29 having at one end thereof an inwardly projecting flange 30, the inner annular edge of which as shown is preferably of convex curvature. The wall of the bore 29, adjacent to the flange 30 is provided with an annular groove 31 in which is seated a second cup-shaped washer 32, having a central tapered or substantially conical-shaped bore 33.

The packing retaining sleeve 12, the washers 27, 28 and 32 and the packing retaining cap 19 form a reversible assembly which may be secured within the cup-shaped casing 10 in the manner shown in Fig. 1 in which the washer 32 is exposed, or in the manner shown in Fig. 3 in which the washer 32 faces towards the base of the casing 10 and its conical bore 33 is pressed into contacting engagement with the conical-shaped tip 15 of the nozzle 13. When the reversible assembly is secured within the casing 10 in the position shown in Fig. 3, the walls 21 of the sleeve 12 project outwardly beyond the end of the casing 10 a sufficient distance to enable the interlocking devices 22 or 23 to be engaged with any of the nipples of the types shown in Figs. 4 to 8 inclusive of the drawing.

When the reversible assembly is secured within the casing 10 in the position shown in Fig. 1 the bore or central aperture of the cup-shaped washer 28 surrounds the periphery of the nozzle 13 and as the conical bore of the washer 32 is exposed said bore may be engaged with the tapered end of a nipple of the type shown in either Fig. 9 or Fig. 8.

It will be noted that the end of the outer wall of the cup-shaped washer 28 projects slightly beyond the inner wall of said washer so that when the packing retaining cap 19 is screwed home within the sleeve 12 said outer wall of said washer only will be engaged by said cap and a small gap, or annular passageway, such as indicated in Fig. 1 by the reference character 34, will be left between the inner end of said cap and the inner wall of the cup-shaped washer for a purpose presently to be more fully described.

In Fig. 4 of the drawing I have, as hereinbefore pointed out, shown a female coupling member or nipple 26 provided with screwthreads 25. These screwthreads may be continuous or may be cut away as indicated by the reference character 35, to form an interlocking device of the breech-block type. The nipple 26 is furthermore provided with a central longitudinal bore 36. One end of the nipple is provided with an external pipe thread and is counterbored as indicated by the reference character 37, the base of said counterbore having an annular valve seating surface 38 which surrounds the end of the bore 36. The bore 36 is normally sealed by means of a valve member 39 preferably constructed of rubber or other suitable, flexible or resilient material, and such valve member 39 is adapted to be normally held against the annular valve seat 38 by any suitable spring or springs.

In order to simplify the construction of the valve member and the spring for holding said member in place I prefer to employ a construction of the general type shown in Figs. 10 and 11, which consists of a piece of flat spring metal having a central substantially circular portion 40 against which the valve member 39 seats. A plurality of spring fingers 41 radiate from the central circular portion 40 and are adapted to be engaged at their ends with suitable recesses or projections formed in the counterbore of the nipple 26. The valve member 39 is secured to the spring by means of tabs 42 which project from the central portion 40, and are bent laterally from such portion, upon the outer periphery of said valve member 39 and into the material thereof so as to hold the same securely interlocked with the spring member. While in Figs. 10 and 11 the radiating spring arms 41 are shown as being of substantially flat construction, such arms may be formed as bowed spring members as indicated by the reference character 41$^a$ in Fig. 4. The ends of the springs 41$^a$ are shown in Fig. 4 as being in engagement with grooves or recesses 43 formed in the counterbore 37.

In Fig. 5 of the drawing I have shown a male coupling member 26$^a$ of the old and well known bayonet type having diametrically extending pins 44 adapted to be engaged with the bayonet slots 22 of the female coupling member shown in Figs. 1 to 3 inclusive. A modified construction of the spring member for holding the valve 39 against the annular valve seat is also shown in Fig. 5, the spring 41$^b$ shown being of the helical type, the smaller end of said spring bears against the valve member 39 and the larger end abuts against an inwardly turned flange 45 formed at the end of the counterbore 37$^a$.

In Fig. 6 of the drawing the male coupling member 26$^b$ is also of the bayonet type and the threaded end thereof is provided with a counterbore 37$^b$ of much smaller depth than the counterbore shown in Fig. 4. The valve member 39 in this view is of the type shown in Figs. 10 and 11, the ends of the spring fingers 41$^a$ being engaged with an inwardly turned flange or projections 46 provided at the outer edge of the counterbore. The packing member 39 is adapted to seat against the annular valve seat 38$^b$ surrounding the end of the longitudinal bore 36$^b$.

In Fig. 7 of the drawing the coupling member 26$^c$ is also of the bayonet type. The valve member 39 and spring 40, 41 is also of the type shown in Figs. 10 and 11. Instead, however, of providing a male pipe thread on the reduced end of the coupling member as shown in Figs. 4, 5, 6 and 8, the end of the coupling member 26$^c$ is formed with a female thread 47 with which is engaged the threaded end of an ordinary pipe coupling nipple 48, the end of the nipple 48 bearing against the ends of the spring arms 41 and holding the spring in position to cause it to force the valve member 39 against the annular valve seat 38$^c$.

In Fig. 8 of the drawing I have shown a male coupling member 26$^d$ which is constructed as a combination of an interlocking type and pressure-hold type nipple. For the purpose of illustration the interlocking means shown in Fig. 8 is also of the bayonet type and is provided with a diametrically extending pin 44$^c$. The end of the nipple is of conical shape as indicated by the reference character 49.

In Fig. 9 is shown a pressure-hold type nipple 26$^e$ having a reduced tapered or conical tip 49$^d$. The valve 39 in Fig. 9 is held in place by a spring 41$^a$ of the type shown in Fig. 4.

In assembling the parts the nozzle 13 is placed into the casing 10 with its reduced threaded end 14 projecting through the aperture in the base of said casing, and the nut or nipple 16 is then threaded on to said reduced end and screwed tightly home thereby forming an unitary assembly of the casing 10, nozzle 13 and nut 16. Washers of suitable packing material are interposed between the nozzle 13 and casing 10 and between the casing 10 and nut 16 to seal the joint against leakage. The metal washer 27 and cup-shaped washer 28 are seated within the base of the counterbore of the sleeve 12 and the washer 32 is seated within the recess 31 of the cap 19, after which the cap 19 is screwed into the sleeve 12 until its inner end is tightly engaged with the end of the outer wall of the washer 28. If the female coupling assembly is to be used with a male member or nipple of the pressure-hold type, the reversible assembly is screwed into the casing 10 as shown in Fig. 1. When in use the entire assembly is held firmly against the tapered end of the male nipple, for example, the nipple 26$^e$ of Fig. 9, the washer 32 yielding sufficiently to permit the convexly rounded annular surface of the flange 30 to engage the tapered end of the nipple with an annular, metal to metal, sealing, line contact. Lubricant under pressure being passed through the coupling joint thus made, will flow through the bores 17 and 18 of the nut 16 and nozzle 13 to the bore 29 of the cap 19. The pressure of such lubricant will be exerted through the annular gap 34 against the inner faces of both the outer and inner walls of the cup-shaped washer 28 thereby spreading such walls apart and causing the outer faces of the outer wall and inner wall respectively to be pressed tightly against the bore of the sleeve 12 and the periphery of the nozzle 13. As the end of the inner wall of the washer is fully exposed to the pressure, as clearly indicated in Fig. 1, such pressure will also tend to force the end of the outer wall more tightly into sealing contact with the end of the retainer cap 19, thus effectively preventing any leakage along either the periphery of the nozzle 13 or through the screwthreaded connection of said cap and the sleeve 12. At the same time, due to the larger cross sectional area of the washer 32 exposed to the fluid pressure within the coupling than the area exposed to such pressure within the tapered aperture 33 of such washer, the latter will also be forced by the pressure into tight sealing engagement with the tapered end 49$^d$ of the nipple 26$^e$.

The fluid will pass through the coupling to the bore of the male coupling member forcing the valve member 39 away from its seat against the action of the spring 41$^a$ and as soon as the flow of the fluid through the coupling ceases the valve member 39 will be automatically returned to its seat by such spring.

When it is desired to use the coupling with a male coupling member of the interlocking type the reversible assembly consisting of the sleeve 12, retainer cap 19 and washers 28, 32 carried thereby is unscrewed from the casing 10, reversed in position and again screwed into the casing in the position shown in Fig. 3. It will be noted by referring to Fig. 3 that when the reversible assembly is reversed the tapered aperture 33 of the washer 32 will be screwed tightly in contact with the reduced tapered end 15 of the nozzle 14. If the coupling is to be associated with a male coupling member or nipple provided with the old and common bayonet type joint, such as shown in Figs. 5 to 8 inclusive, the pins 44 will be engaged within the bayonet slots 22 in the well known manner, it being noted that when the reversible assembly is associated with the casing 10 in the manner shown in Fig. 3 that portion of the assembly which is provided with the bayonet slot and screwthreads projects sufficiently beyond the end of the casing 10 to enable the male and female coupling members to be readily interlocked. It will further be noted that when the female member of the coupling is connected to a male member of the interlocking type the end of the male member will project through the central aperture of the cup-shaped washer 28. When the lubricant is passed through the coupling members, assembled as shown in Fig. 3, the manner in which the cup-shaped washers will function is substantially the same as that described in connection with the showing of Fig. 1, except that the washer 32 will be engaged with the nozzle 13 while the cup-shaped washer 28 will surround the outer cylindrical end and engage with the periphery of the respective nipple with which it is used.

It will be understood that each of the valves 39 shown in Figs. 4 to 9 inclusive will function substantially in the same way when the lubricant is passed through the coupling.

It will be noted that the invention herein disclosed possesses the following important advantages: The female member of the coupling is so constructed that when it is employed with a pressure-hold type male coupling member the shoulder formed at the base of the casing 10 between the outer periphery of the casing and the periphery of the nut or nipple 16 forms an abutment surface against which the user may conveniently exert considerable pressure to hold the coupling members in tight sealing engagement. By making the nut or nipple 16 as a separate member rather than integral with the casing 10 the manufacturing operations are simplified considerably so that all of the parts of the coupling may be made readily upon automatic screw machines, punch or die presses. The use of flexible packing material for the valve 39 eliminates the danger of the valve being rendered inoperative by grit or foreign matter which may be carried under the valve seat by incoming fluid, the flexible material of the valve permitting the valve to yield sufficiently to compensate for the presence of such foreign particles. The use of a threaded retainer cap for the U-shaped packing ring or washer 28 permits such washer to be made of thicker material than heretofore possible and consequently makes such packing ring better able to withstand high pressures to which it may be subjected. Furthermore, by the use of this U-shaped packing member the strain on the coupling means is to some extent relieved in that area which tends to press the male member outwardly as such area is reduced to merely the area of the end of the male member rather than to the area of the entire packing washer. In addition, as the inner wall of the U-shaped packing ring presses with considerable force upon the outer surface of the cylindrical male member with which it co-operates, both when assembled as in Fig. 1 and in Fig. 3, the U-shaped ring exerts a gripping action as well as a sealing action upon such cylindrical male member which tends to prevent outward travel or accidental disengagement of the parts. The employment of a retainer cap for the packing rings makes it possible to replace such rings with very little effort when either of them become worn. The use of a packing retainer having the constructional features disclosed whereby such retainer may be readily reversed makes it possible to employ a single coupling member universally with many different types of male coupling members thereby obviating the necessity for the use of specially constructed adapters. The female coupling member is more compact longitudinally than any coupling members heretofore constructed especially for use with lubricating apparatus and at the same time the construction permits the coupling member to be made somewhat larger in diameter thereby providing a better grip for the operator and making it easier for him to turn the coupling in order to make a connection for either a bayonet type, a threaded type or a breech type interlock.

Another advantage of the U-shaped washer is that as it is brought in contact with the male coupling member, it has a wiping action which removes any accumulation of grit or dirt from the contacting surface of the male member, this insuring a perfect pressure tight seal; whereas in the type of coupling where the seal is obtained between a flat washer and the end of the male member, there is no means provided for automatically removing grit from the contacting surface of the male member, and any foreign matter remaining on the end of the male member has a tendency to hold the washer in the female member spaced from the end of the male member to an extent sufficient to permit leakage.

While the coupling described and shown in the attached drawing forms a highly satisfactory and commercially practical constructional example embodying the principles of the invention, it will be understood that the invention is not limited to the specific constructional details described and shown but that many changes, variations and modifications may be resorted to without departing from such principles.

I claim:

1. In a coupling, a casing having a nozzle fixed therein, a cup-shaped washer surrounding said nozzle, said washer being U-shaped in cross section with the open end of the U exposed to pressure within said casing whereby said pressure will force the sides of said washer into sealing contact with the side walls of said casing and said nozzle, and a screwthreaded packing retaining cap for holding said washer in fixed position relatively to said nozzle.

2. In a coupling, a female coupling member provided with means for enabling said coupling to be universally employed with different types of male coupling members, said means comprising a screwthreaded cup-shaped casing and a reversible assembly capable of being detachably secured within said casing in either of two positions, said assembly being provided at one end with interlocking means for securing the female coupling member to a male coupling member and being provided on the other end with means for holding the female coupling member in sealing engagement by the exertion of manual pressure with a pressure-hold type of male coupling member.

3. In a coupling, a casing provided with means for attaching it to a pipe line or conduit, a nozzle carried by said casing, a reversible packing retaining member detachably secured within said casing, and a cup-shaped washer carried by said packing retaining member, said washer in one position of said reversible member engaging said nozzle with a sealing contact, and in another position of said member being adapted to engage with sealing contact a male coupling member.

4. In a coupling, a female coupling member having a casing provided with means for securing it to a pipe line or conduit, a nozzle mounted within said casing, a reversible packing retaining member detachably mounted within said casing, a pair of packing rings carried by said member, one of said rings in one position of said reversible member co-operating with said nozzle to form a liquid-tight sealed joint therewith and the other forming a similar joint with a male coupling member of the interlocking type, and in another position of said reversible member said one packing ring forming a joint with a male coupling member and said other packing member forming a joint with said nozzle.

5. In a coupling, a reversible assembly provided at one end thereof with means to form a liquid-tight joint with a co-operating coupling member of the pressure-hold type and at the other end provided with means for engagement with a co-operating coupling member of the interlocking type.

6. In a coupling, a reversible assembly provided at one end thereof with a convexly curved, annular metal surface and a flexible packing member adjacent said surface, said packing member and said surface being adapted to co-operate in one position of said reversible assembly with a co-operating coupling member of the pressure-hold type and said reversible assembly being provided at the other end thereof with means for engaging a co-operating coupling member of the interlocking type.

7. In a coupling, a reversible assembly provided at one end thereof with a plurality of means for forming a liquid-tight seal with a co-operating coupling member of the pressure-hold type and at its other end provided with a plurality of interlocking means adapted to be detachably engaged with interlocking, co-operating, coupling members of different types.

8. In a coupling, a reversible assembly comprising a sleeve provided at one end thereof with a plurality of quick, detachable, interlocking, coupling means, a U-shaped washer seated within said sleeve, a packing retaining cap detachably secured within said sleeve, and pressing against said cup-shaped washer, and a second U-shaped washer mounted within said packing retaining cap.

9. In a coupling, a unitary assembly comprising a cup-shaped casing, a nozzle concentrically mounted therein, and a screwthreaded pipe connection secured thereto; and a reversible packing retaining member detachably mounted in said casing, said reversible member comprising a pair of flexible packing rings adapted in either position of said reversible member to co-operate interchangeably with said nozzle and with male coupling members of different types.

10. A universal coupling comprising a casing, a reversible assembly detachably secured within said casing, said reversible assembly being provided at one end thereof with means for forming a liquid-tight sealing joint with a co-operating pressure-hold coupling member, and being provided at the other end thereof with quick, detachable, interlocking means of the bayonet type, of the screwthread type and of the breech block type.

11. In a coupling, an assembly consisting of a screw-threaded cup-shaped casing, a connector for engaging a grease receiving plug detachably secured to said casing, a nozzle mounted within said casing in fluid tight engagement with said connector, and a pipe threaded connecting nipple in axial alignment with said nozzle, said nipple and nozzle being provided with co-operating interengaged screw threads by means of which said casing nozzle and nipple are secured together in assembled condition.

WALTER H. RUDOLPH.